(12) United States Patent
Hughes et al.

(10) Patent No.: US 9,030,951 B2
(45) Date of Patent: May 12, 2015

(54) SYSTEM AND METHOD FOR IMPROVING NETWORK CONVERGENCE VIA ADAPTIVE ROUTING TECHNIQUES

(75) Inventors: Sterling Hughes, Oakland, CA (US); Peter Hunt, Sunnyvale, CA (US); Jana Van Greunen, Woodside, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 108 days.

(21) Appl. No.: 13/329,101

(22) Filed: Dec. 16, 2011

(65) Prior Publication Data
US 2013/0155880 A1   Jun. 20, 2013

(51) Int. Cl.
*H04L 12/26* (2006.01)
*H04L 12/28* (2006.01)
*H04L 12/801* (2013.01)

(52) U.S. Cl.
CPC ..................... *H04L 47/10* (2013.01)

(58) Field of Classification Search
None
See application file for complete search history.

(56) References Cited

U.S. PATENT DOCUMENTS

| | | | |
|---|---|---|---|
| 2003/0039212 A1* | 2/2003 | Lloyd et al. | 370/235 |
| 2005/0180438 A1* | 8/2005 | Ko et al. | 370/401 |
| 2005/0185587 A1* | 8/2005 | Klinker | 370/237 |
| 2007/0206503 A1* | 9/2007 | Gong et al. | 370/238 |
| 2010/0095167 A1* | 4/2010 | Kotrla et al. | 714/705 |
| 2010/0118714 A1* | 5/2010 | Labovitz | 370/252 |
| 2010/0150005 A1* | 6/2010 | Gerber et al. | 370/252 |
| 2010/0290441 A1* | 11/2010 | Stewart | 370/338 |
| 2010/0329138 A1* | 12/2010 | Cauchie et al. | 370/252 |
| 2012/0117208 A1* | 5/2012 | Shaffer et al. | 709/221 |
| 2012/0140675 A1* | 6/2012 | Mishra et al. | 370/254 |
| 2012/0155475 A1* | 6/2012 | Vasseur et al. | 370/400 |

OTHER PUBLICATIONS

Charles M. Kozierok, The TCP/IP Guide, "RIP Special Features for Resolving RIP Algorithm Problems" at 4 (Ver. 3, Sep. 20, 2005), available at http://www.tcpipguide.com/free/t_RIPSpecialFeaturesForResolvingRIPAlgorithmProblems-4.htm.*

* cited by examiner

*Primary Examiner* — Afshawn Towfighi
(74) *Attorney, Agent, or Firm* — Artegis Law Group, LLP

(57) ABSTRACT

One embodiment of the present invention sets forth a technique for a node within a network to adjust one or more routing parameters based on certain network parameters. A node monitors certain network metrics such as the mean time between routing drops. In response to changes in these network parameters, the node changes certain routing parameters, such as the holddown time. The node may store network metrics and associated routing parameters that result in preferred network operating conditions. The node may pre-load these beneficial settings upon the occurrence of a particular condition such as a system reset of the node. Moreover, a node may share these beneficial settings with neighboring nodes on the same network. One advantage of this approach is that cost savings are achieved when a node within a network may be installed without preconfiguring the node with specific routing parameters.

20 Claims, 4 Drawing Sheets

SYSTEM AND METHOD FOR IMPROVING NETWORK CONVERGENCE VIA ADAPTIVE ROUTING TECHNIQUES

BACKGROUND OF THE INVENTION

1. Field of the Invention

Embodiments of the present invention relate generally to wireless digital communication systems and methods and, more specifically, to a system and method for improving network convergence via adaptive routing techniques.

2. Description of the Related Art

A conventional wireless mesh network includes a plurality of nodes, each incorporating a network interface. A given node may transmit payload data to one or more other nodes via the network interface. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network. A given node may send payload data directly to a corresponding access point. Additionally, the node may forward payload data to the access point on behalf of one or more other nodes within the wireless mesh network. The access point collects payload data for various nodes within the wireless mesh network and forwards the payload data to the related service system through some form of system network such as a wide-area network (WAN).

Each node within a network system is pre-configured with certain parameters well-suited to achieve convergence within a given network system. For example, a given network system may require rapid convergence to meet specific performance requirements. Such a network may tolerate more stringent routing parameter settings in order to achieve rapid convergence. The nodes within the network system are pre-configured with these stringent parameter settings, such that when the nodes are deployed within the network system, convergence is achieved within the requisite period of time. In another network, such stringent node parameters may cause the network to become unstable such that the network may not be able to achieve or maintain convergence. For example, this condition may occur in a network with a large number of nodes or under conditions where conditions for network communications are less than optimal. In this case, the nodes are pre-configured with less stringent routing parameter settings. Accordingly, the amount of time required to achieve convergence may increase, however the network is able to achieve and maintain stability for a longer period of time.

One disadvantage of approach is that each node must be preconfigured for the specific network environment when the node is deployed. Preconfiguring each node may increase installation cost per node and may also increase the skill required to install nodes within a given network system. Another disadvantage of this approach is that the pre-configured routing parameter settings may be appropriate for a given node at the time of installation, but may no longer be appropriate as the network topology or communications conditions change over time. A network system that may have been able to achieve convergence, maintain stability, and meet performance goals at the time of installation may no longer perform adequately as nodes are added and deleted or as communications conditions improve or degrade.

As the foregoing illustrates, what is needed in the art is a more flexible technique for to achieve convergence within a network system.

SUMMARY OF THE INVENTION

One embodiment of the present invention sets forth a method for a node within a network system to adjust routing parameters. The node measures a value for at least one network metric. The node then adjusts at least one routing parameter to an adjusted setting, where the routing parameter is related to the one or more network metrics. The node measures a second value for the one or more network metrics. The node then determines if the network metrics have improved based on comparing the second value for the network metrics relative to the first value for network metrics. Then, the node sets one or more routing parameters to the adjusted setting in response to determining that the network metrics have improved.

Other embodiments include, without limitation, a computer-readable medium that includes instructions that enable a processing unit to implement one or more aspects of the disclosed methods as well as a system configured to implement one or more aspects of the disclosed methods.

One advantage of this approach is that cost savings are achieved when a node within a network may be installed without preconfiguring the node with specific routing parameters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
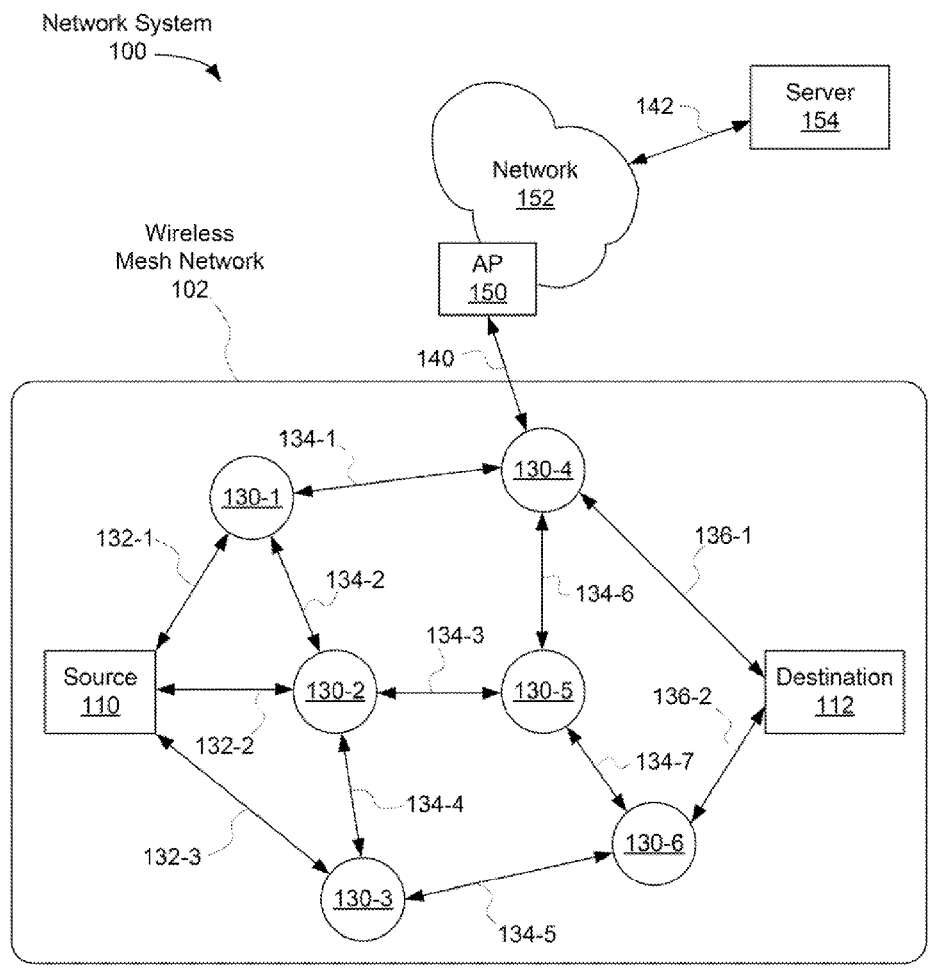
FIG. 1 illustrates a network system, according to one embodiment of the invention.

FIG. 1 illustrates a network system 100, according to one embodiment of the invention. The network system 100 comprises a wireless mesh network 102, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

As shown, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The network 152 may be coupled to the server 154 via communications link 142. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the server 154 as the data becomes available via autonomous reporting.

Upon the occurrence of a specific condition, a node 130 loads initial values for various routing parameters. The routing parameters may include, without limitation, initial values for timers utilized for routing advertisements, holddown times, or poison times. A routing advertisement timer determines the time a node 130 waits between successive routing advertisements, where a routing advertisement announces the availability of a particular routing path. A holddown timer determines the amount of time the node 130 discards any route messages for a routing path that has become unreachable. A poison timer determines the amount of time a node 130 waits after discovering a distant node 130 is unreachable before announcing that the routing path to the distant node 130 is invalid.

The node 130 then monitors one or more input conditions representing network metrics which reflect the current communications conditions within the network system 100. For example, a node 130 may monitor, without limitation, the average time that a routing path is unavailable when the routing path is lost or the number of times that a routing path is lost during a specified period of time. The node 130 then makes an adjustment in one or more the node's 130 routing parameters, with the purpose of measuring the effect of the routing parameter changes on the network metrics. The node 130 then measures the network metrics again to see whether the metrics have improved. If the metrics show an improvement, then the node 130 sets the routing parameters to the adjusted value. If the metrics do not show an improvement, then the node 130 continues to use the existing value for the routing parameters. In either case, the node 130 continues to adjust various routing parameters and measure the resulting effect on the network metrics, with the goal of improving network operating conditions.

In addition, the node may store or transmit settings which tend to improve the measured network metrics to facilitate more rapid convergence over time. For example, when the node 130 finds a value for the routing parameters that improves the network metrics, the node 130 may compare the network metrics with values for the network metrics which have been previously stored in memory. The values stored in memory may be values for network metrics and associated routing parameters indicating particularly beneficial network operating conditions. If the current network metrics, resulting from adjustment to the routing parameters, show improved conditions relative to the values stored in memory, then the node 130 may store the current values for network metrics and associated routing parameters. These "beneficial settings" may later be retrieved and utilized upon the occurrence of a particular condition, such as a system reset of the node 130. In another example, the node 130, may share these beneficial settings with other neighboring nodes 130 within the same network system 100. Accordingly, nodes 130 may utilize one or more beneficial settings from neighboring nodes 130.

Figure 2:
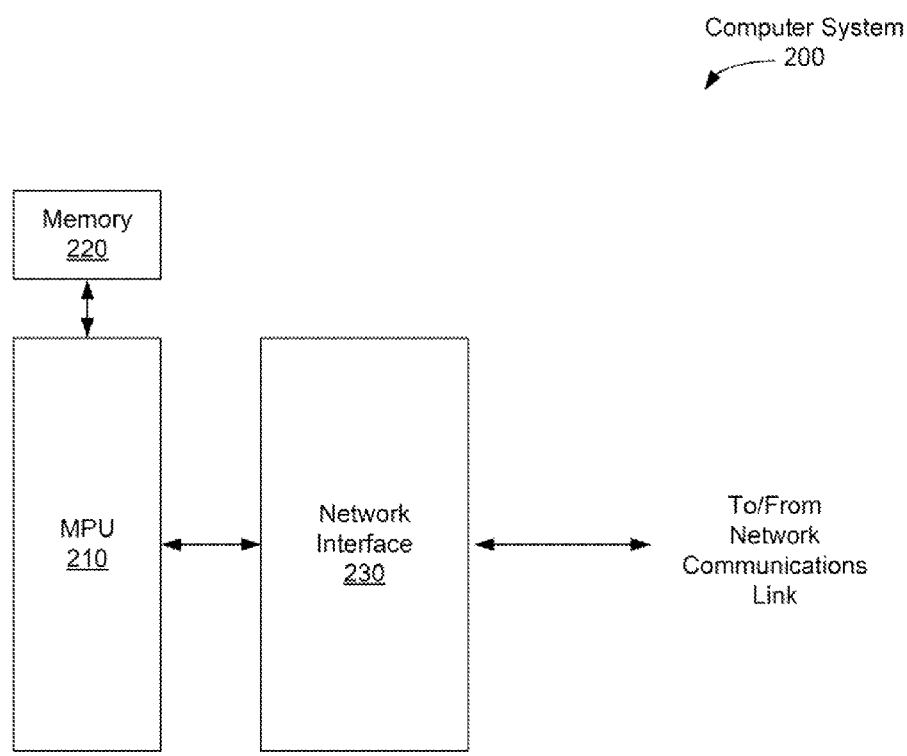
FIG. 2 illustrates a computer system configured to implement one or more aspects of the present invention.

FIG. 2 illustrates a computer system 200 configured to implement one or more aspects of the present invention. Each node 110, 112, 130 and each access point 150 within the wireless mesh network 102 of FIG. 1 typically includes at least one instance of the computer system 200. As shown, the computer system 200 may include, without limitation, a microprocessor unit (MPU) 210, a memory 220, and a network interface 230. In one embodiment, the MPU 210 implements procedures for processing IP packets transmitted or received as payload data by the computer system 200. The procedures for processing the IP packets may include, without limitation, wireless routing, encryption, authentication, protocol translation, and routing between and among different wireless and wired network ports. A memory 220 may be coupled to the MPU 210 for local program and data storage.

A network interface 230 may be coupled to implement, without limitation, one or more the communication links 132, 134, 136, 140. The network interface 230 may utilize any technically feasible network protocol including, without limitation, a WAN or a local-area network (LAN). Moreover, multiple network types may be implemented within a given network interface 230. For example, communications between two nodes 130 or between a node 130 and the corresponding access point 150 may be via a radio-frequency local-area network (RF LAN), while communications between access points 150 and the network 152 may be via a WAN such as a general packet radio service (GPRS) network. The network system may be of any technically feasible type or configuration. For example, the network system may be, without limitation, a distribution automation (DA) network or an advanced metering infrastructure (AMI) network.

Figure 3:
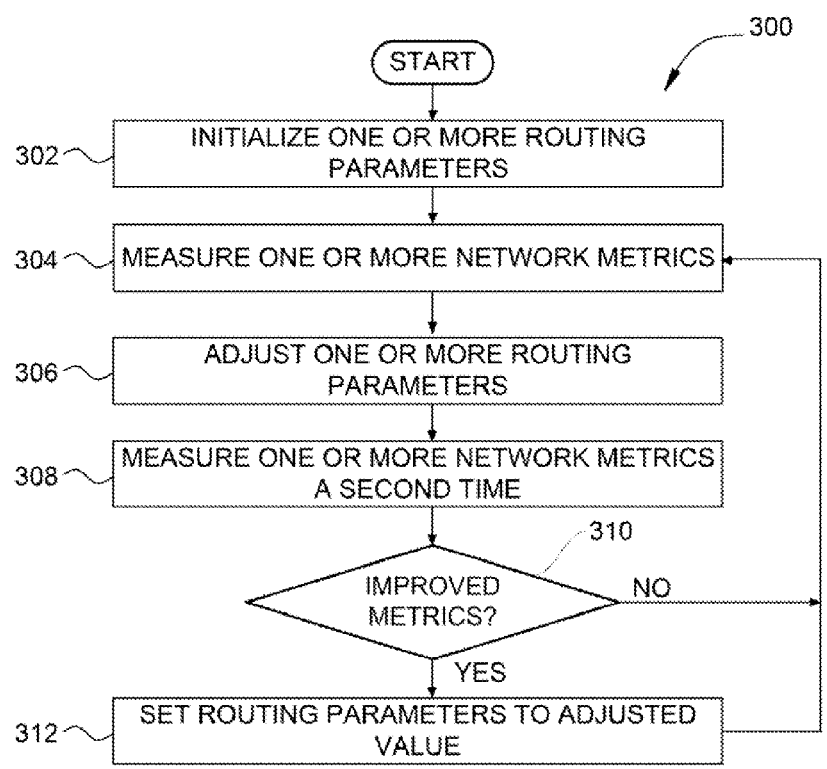
FIG. 3 is a flow diagram of method steps for adjusting router parameters within a network node, according to one embodiment of the present invention.

FIG. 3 is a flow diagram of method steps 300 for adjusting router parameters within a network node 130, according to one embodiment of the present invention. Although the method steps 300 are described in conjunction with the systems of FIG. 1, persons of ordinary skill in the art will understand that any system configured to perform the method steps 300, in any order, is within the scope of the present invention.

The method 300 begins at step 302, where the node 130 initializes one or more routing parameters, upon the occurrence of a specified condition. For example, the node 130 may initialize a routing advertisement timer, holddown timer, or poison timer at a system reset. At step 304, the node 130 measures a value for one or more network metrics. For example, the node 130 may measure the average time that a routing path is unavailable when the routing path is lost or the number of times that a routing path is lost during a specified period of time. At step 306, the node 130 adjusts one or more routing parameters that may have an effect on the network metrics. For example, the node 130 may increase or decrease the a setting for a holddown timer, which increases or decreases the amount of time the node 130 discards any route messages for a routing path that has become unreachable. At step 308, the node 130 again measures a value for the network metrics.

A step 310, the node 130 determines whether the second measurement indicates an improvement in the network metrics relative to the first measurement. For example, the node 130 may determine that the average time that a routing path is unavailable when the routing path is lost has been reduced after adjusting the holddown timer. If the network metrics have not improved, then the method 300 returns to step 304 and proceeds as set forth above. For example, the node 130 continues to use the existing setting for the holddown timer. If the network metrics have improved, then the method 300 proceeds to step 312, where the node 130 sets the routing parameters to the adjusted settings as adjusted in step 306. For example, the node 130 sets the holddown timer to the setting as adjusted in step 306. The method 300 then returns to step 304 and proceeds as set forth above.

Figure 4:
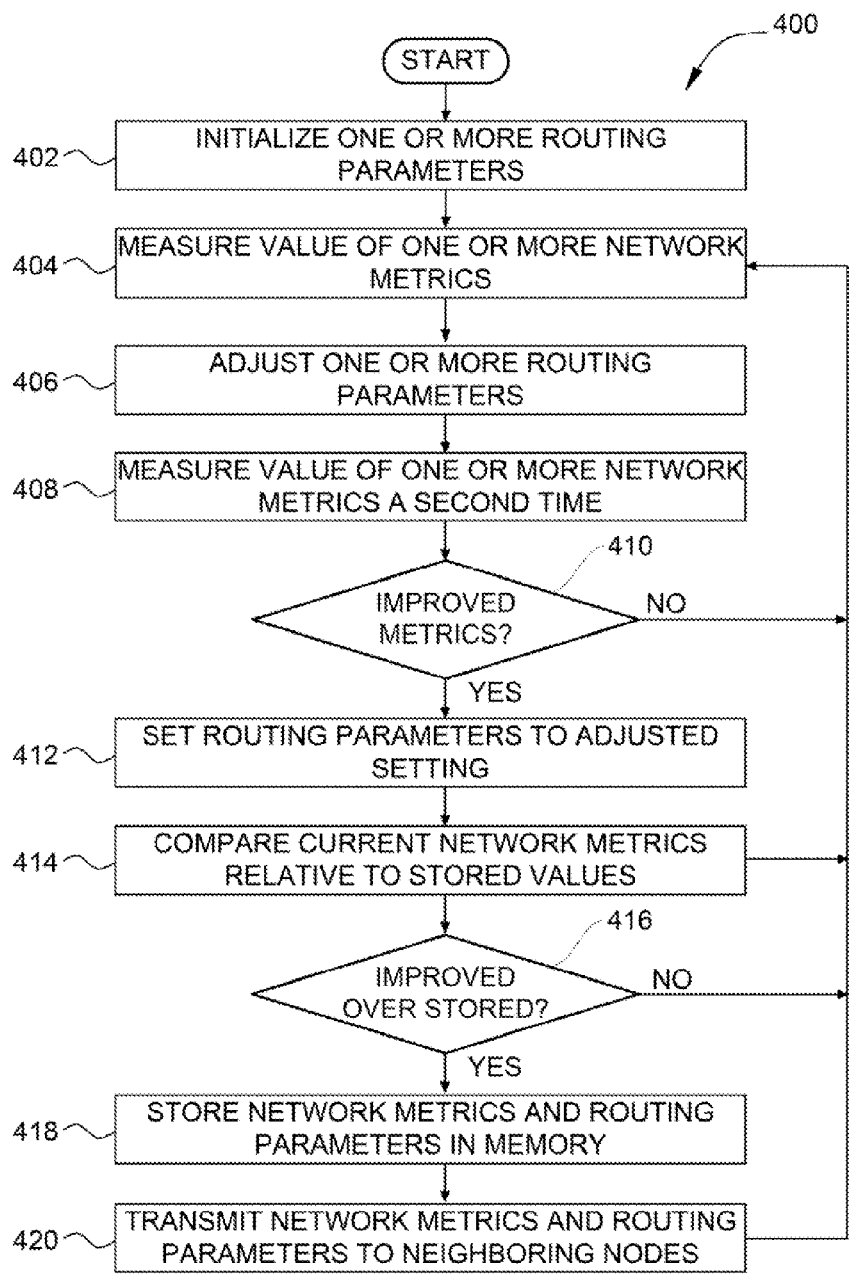
FIG. 4 is a flow diagram of method steps for adjusting router parameters within a network node, according to an alternative embodiment of the present invention.

FIG. 4 is a flow diagram of method steps 400 for adjusting router parameters within a network node 130, according to an alternative embodiment of the present invention. Although the method steps 400 are described in conjunction with the systems of FIG. 1, persons of ordinary skill in the art will understand that any system configured to perform the method steps 400, in any order, is within the scope of the present invention.

The method 400 begins at step 402, where the node 130 initializes one or more routing parameters, upon the occurrence of a specified condition. For example, the node 130 may initialize a routing advertisement timer, holddown timer, or poison timer at a system reset. At step 404, the node 130 measures a value for one or more network metrics. For example, the node 130 may measure the average time that a routing path is unavailable when the routing path is lost or the number of times that a routing path is lost during a specified period of time. At step 406, the node 130 adjusts one or more routing parameters that may have an effect on the network metrics. For example, the node 130 may increase or decrease the a setting for a holddown timer, which increases or decreases the amount of time the node 130 discards any route messages for a routing path that has become unreachable. At step 408, the node 130 again measures a value for the network metrics.

A step 410, the node 130 determines whether the second measurement indicates an improvement in the network metrics relative to the first measurement. For example, the node 130 may determine that the average time that a routing path is unavailable when the routing path is lost has been reduced after adjusting the holddown timer. If the network metrics have not improved, then the method 400 returns to step 404 and proceeds as set forth above. For example, the node 130 continues to use the existing setting for the holddown timer. If the network metrics have improved, then the method 400 proceeds to step 412, where the node 130 sets the routing parameters to the adjusted settings as adjusted in step 406. For example, the node 130 sets the holddown timer to the setting as adjusted in step 406. At step 416, the node 130 compares the current value of the network metrics with a value of the network metrics that have been previously stored in memory. The value stored in memory may include a set of network metric values and associated routing parameters representing beneficial network operating conditions previously observed by the node 130. If the current network metrics are not an improvement as compared to the value stored in memory, then the method 400 then returns to step 404 and proceeds as set forth above. If the current network metrics are an improvement as compared to the value stored in memory, then the method 400 proceeds to step 418 where the node 130 stores the current network metrics and the associated routing parameters in memory 220. At step 420, the node 130 transmits the network metrics and associated routing parameters to one or more neighboring nodes 130. The method 400 then returns to step 404 and proceeds as set forth above.

In sum, the disclosed technique provides an improved way for a node 130 within a network system 100 to adjust one or more routing parameters based on certain network metrics. Specifically, a node 130 measures certain network metrics such as the mean time between routing drops. The node 130 then adjusts one or more routing parameters, such as the setting for a holddown timer, with the goal of improving one or more of the network metrics. The node 130 measures the network metrics a second time to determine whether the network metrics have improved relative to the first measurement. If the network metrics indicate an improvement, then the node 130 sets the routing parameters to the adjusted setting. The node 130 may store network metrics and the associated routing parameter values that result in beneficial network operating conditions. The node 130 may later use these beneficial settings upon the occurrence of a particular condition such as a system reset of the node 130. Moreover, a node 130 may share these beneficial settings with neighboring nodes 130 on the same network system 100.

Advantageously, cost savings are achieved when a node 130 within a network system 100 may be installed without preconfiguring the node 130 with specific routing parameters. Upon installation, the node 130 monitors input conditions and automatically adjusts routing parameters to achieve desired values for these input conditions. The node 130 continues to monitor and adjust the routing parameters allowing the node 130 to adapt to changing network topologies and communication conditions. Parameter settings that produce optimum parameter settings may be stored, reducing convergence time after a system reset. Optimal parameter settings may be shared with neighboring nodes 130 further improving convergence times.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for adjusting routing parameters within a first node in a network system, the method comprising:
    measuring a first value for at least one network metric;
    adjusting at least one routing parameter having an initial value associated with a timer that is related to the at least one network metric to an adjusted timer value, wherein the adjusted timer value has an initial value associated with a routing advertisement timer that determines an amount of time that the first node waits between successive routing advertisements that indicate the availability of a particular routing path;
    measuring a second value for the at least one network metric;
    determining that the at least one network metric has improved based on the second value for the at least one network metric relative to the first value for the at least one network metric; and
    in response to determining that the at least one network metric has improved, setting the at least one routing parameter to the adjusted setting comprising the adjusted timer value.

2. The method of claim 1, further comprising:
    comparing the second value for the at least one network metric with a third value for the at least one network metric, wherein the third value for the at least one network metric has been previously stored within a memory;
    determining that the second value for the at least one network metric is improved relative to the previously stored third value for the at least one network metric; and
    storing the second value for the at least one network metric and the associated adjusted timer value in the memory.

3. The method of claim 2, further comprising transmitting the second value for the at least one network metric and the associated adjusted timer value to a second node.

4. The method of claim 1, wherein the at least one network metric is related to the adjusted timer value and comprises an average amount of time that a routing path is unavailable when the routing path is lost.

5. The method of claim 1, wherein the at least one network metric is related to the adjusted timer value and comprises a number of times that a routing path is lost during a specified period.

6. The method of claim 1, wherein the adjusted timer value comprises an initial value for a holddown timer that determines an amount of time that the first node discards any route messages for a routing path that has become unreachable.

7. The method of claim 1, wherein the network system comprises an advanced metering infrastructure (AMI) network.

8. The method of claim 1, wherein the network system comprises a distribution automation (DA) network.

9. A non-transitory computer-readable medium including instructions that, when executed by a processing unit, cause the processing unit to adjust routing parameters within a first node in a network system, by performing the steps of:
    measuring a first value for at least one network metric;
    adjusting at least one routing parameter having an initial value associated with a timer that is related to the at least one network metric to an adjusted timer value, wherein the adjusted timer value has an initial value associated with a routing advertisement timer that determines an amount of time that the first node waits between successive routing advertisements that indicate the availability of a particular routing path;
    measuring a second value for the at least one network metric;
    determining that the at least one network metric has improved based on the second value for the at least one network metric relative to the first value for the at least one network metric; and
    in response to determining that the at least one network metric has improved, setting the at least one routing parameter to the adjusted setting comprising the adjusted timer value.

10. The computer-readable medium of claim 9, further comprising:
    comparing the second value for the at least one network metric with a third value for the at least one network metric, wherein the third value for the at least one network metric has been stored within a memory;
    determining that the second value for the at least one network metric is improved relative to the previously stored third value for the at least one network metric; and
    storing the second value for the at least one network metric and the associated adjusted timer value in the memory.

11. The computer-readable medium of claim 10, further comprising transmitting the second value for the at least one network metric and the associated adjusted timer value to a second node.

12. The computer-readable medium of claim 9, wherein the at least one network metric is related to the adjusted timer value and comprises an average amount of time that a routing path is unavailable when the routing path is lost.

13. The computer-readable medium of claim 9, wherein the at least one network metric is related to the adjusted timer value and comprises a number of times that a routing path is lost during a specified period.

14. The computer-readable medium of claim 9, wherein the adjusted timer value comprises an initial value for a holddown timer that determines an amount of time that the first node discards any route messages for a routing path that has become unreachable.

15. The computer-readable medium of claim 9, wherein the network system comprises an advanced metering infrastructure (AMI) network.

16. The computer-readable medium of claim 9, wherein the network system comprises a distribution automation (DA) network.

17. A computing device comprising:
    a processing unit configured to adjust routing parameters within a first node in a network system, by performing the steps of:
        measuring a first value for at least one network metric;
        adjusting at least one routing parameter having an initial value associated with a timer that is related to the at least one network metric to an adjusted timer value, wherein the adjusted timer value has an initial value associated with a routing advertisement timer that determines an amount of time that the first node waits between successive routing advertisements that indicate the availability of a particular routing path;
        measuring a second value for the at least one network metric;
        determining that the at least one network metric has improved based on the second value for the at least one network metric relative to the first value for the at least one network metric; and
        in response to determining that the at least one network metric has improved, setting the at least one routing parameter to the adjusted setting comprising the adjusted timer value.

18. The computing device of claim 17, wherein the processing unit is further configured to perform the steps of:
    comparing the second value for the at least one network metric with a third value for the at least one network metric, wherein the third value for the at least one network metric has been stored within a memory;
    determining that the second value for the at least one network metric is improved relative to the previously stored third value for the at least one network metric; and
    storing the second value for the at least one network metric and the associated adjusted timer value in the memory.

19. The computing device of claim 18, wherein the processing unit is further configured to perform the step of transmitting the second value for the at least one network metric and the associated adjusted timer value to a second node.

20. The computing device of claim 17, wherein the network system comprises a distribution automation (DA) network.

\* \* \* \* \*